United States Patent
Hartman et al.

(10) Patent No.: US 7,175,529 B2
(45) Date of Patent: Feb. 13, 2007

(54) METHOD AND APPARATUS FOR RF TRANSMITTER LAYOUT IN A GAMING HALL

(75) Inventors: Michael W. Hartman, Reno, NV (US); David Loar, Reno, NV (US); Brett N. Keeton, deceased, late of Reno, NV (US); Hilary Keeton, legal representative, Reno, NV (US)

(73) Assignee: Game Tech International, Inc., Reno, NV (US)

( * ) Notice: Subject to any disclaimer, the term of this patent is extended or adjusted under 35 U.S.C. 154(b) by 0 days.

(21) Appl. No.: 10/244,098

(22) Filed: Sep. 13, 2002
(Under 37 CFR 1.47)

(65) Prior Publication Data
US 2006/0189388 A1 Aug. 24, 2006

(51) Int. Cl.
*A63F 13/00* (2006.01)
(52) U.S. Cl. .............................. 463/39; 463/40; 463/42
(58) Field of Classification Search ................. 463/1, 463/25, 29, 39–43; 700/91–93
See application file for complete search history.

(56) References Cited

U.S. PATENT DOCUMENTS

| 4,525,861 A * | 6/1985 | Freeburg ................. 455/422.1 |
| 5,770,533 A * | 6/1998 | Franchi ...................... 463/42 |
| 2002/0049088 A1* | 4/2002 | Fields .......................... 463/43 |
| 2003/0040354 A1* | 2/2003 | Itkis et al. .................... 463/19 |
| 2003/0104865 A1* | 6/2003 | Itkis et al. .................... 463/39 |

* cited by examiner

*Primary Examiner*—John M. Hotaling, II
(74) *Attorney, Agent, or Firm*—Greenberg Traurig LLP; John R. Wahl

(57) ABSTRACT

A method of administering a game in a wireless embodiment utilizing multiple transmitters connected to a game server and base station controller is disclosed. The method comprises generating game state data describing game state in a bingo game; passing the game state data to each transmitter in a plurality of transmitters; and transmitting from transmitters in the plurality in sequence the game state signal to a wireless receiver, wherein the game state data are transmitted repeatedly.

32 Claims, 13 Drawing Sheets

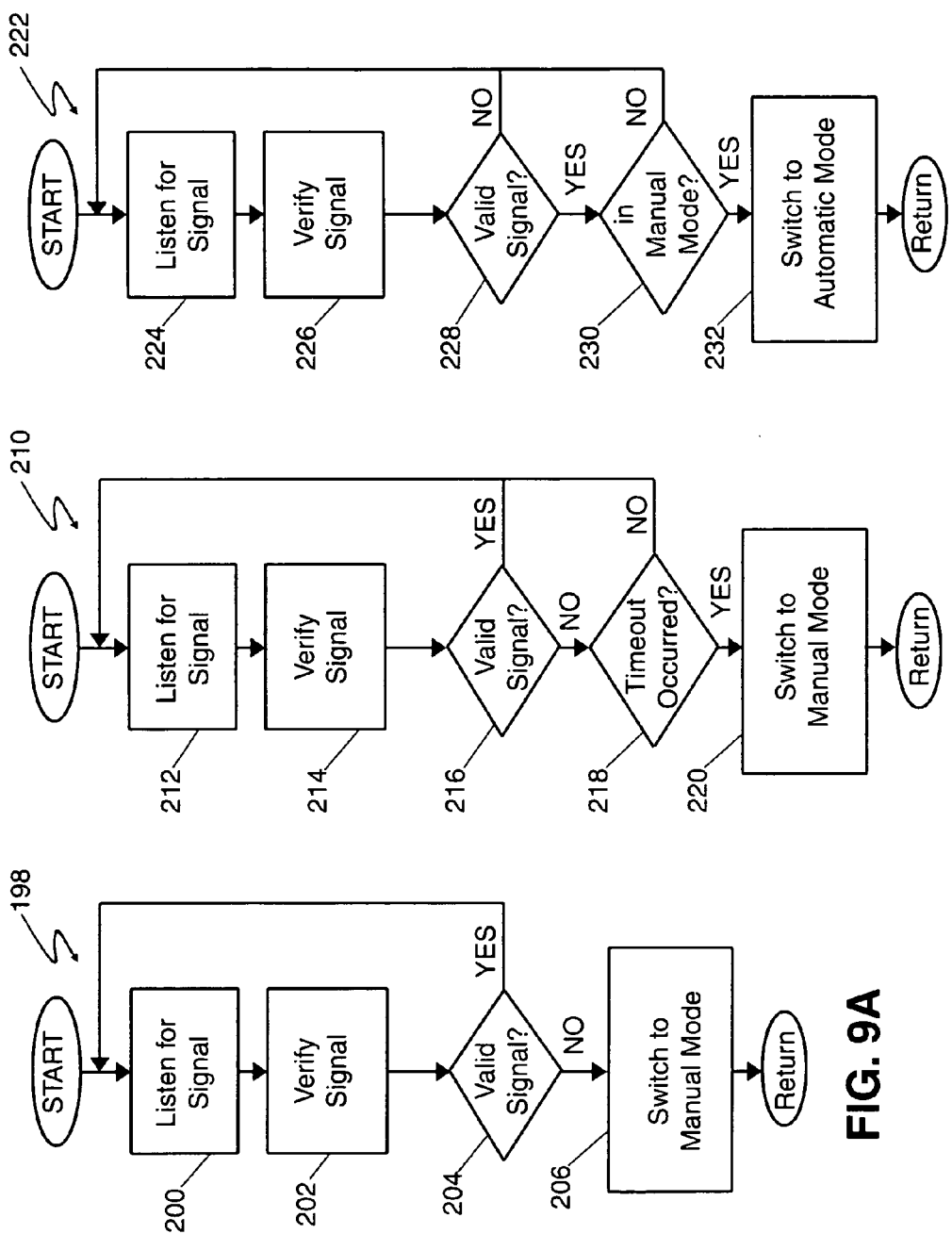

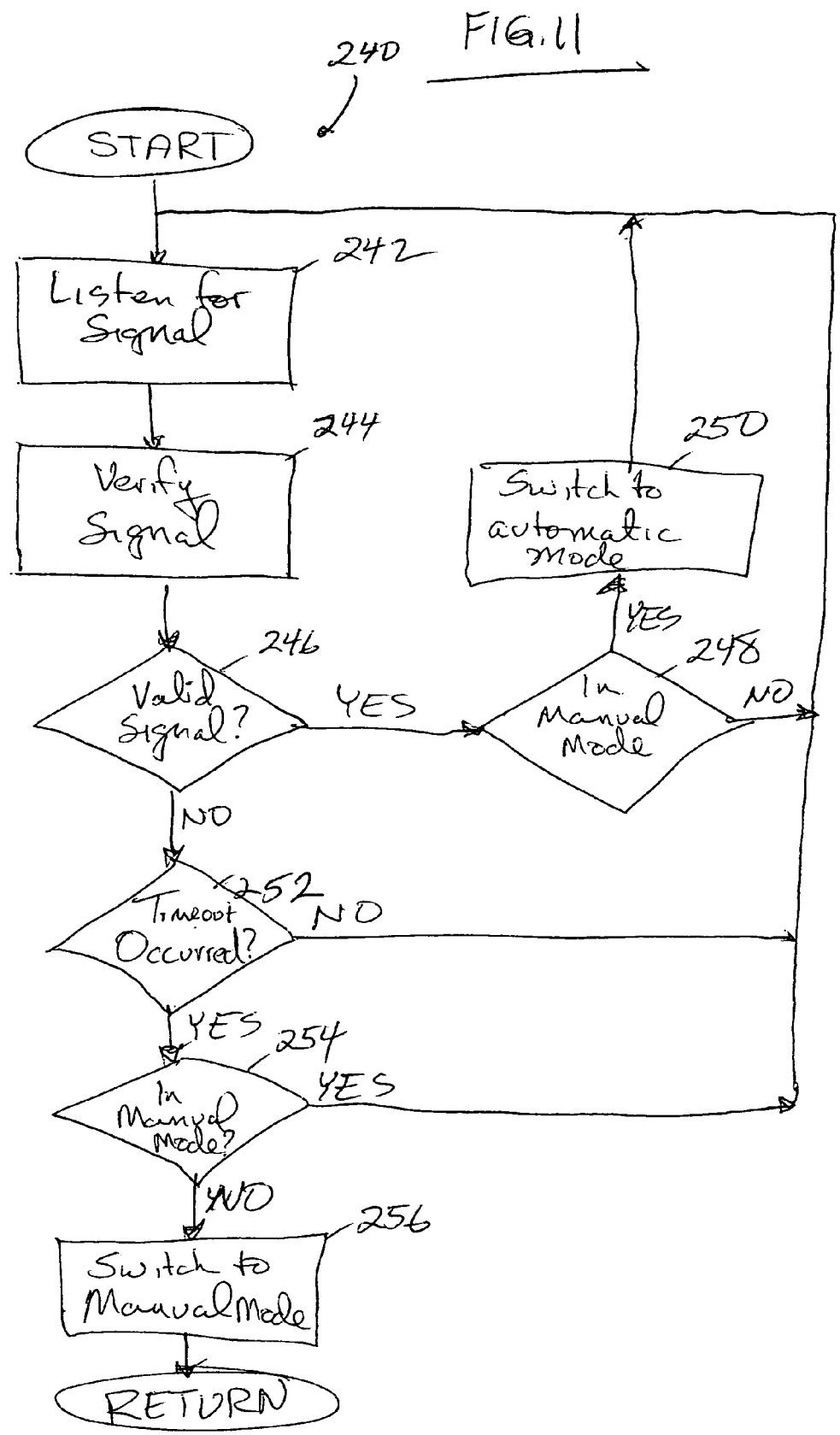

FIG. 12A

| 282 | 284 | 286 | 288 | 280 |
|---|---|---|---|---|
| Header | Session | Numbers Called | Numbering Order | 270 Numbers Called |

FIG. 12B

| | 292 | 294 | 296 | 278 |
|---|---|---|---|---|
| 274 Numbers Called | Pattern ID | Last # Called | Current Recall | Verification |

276 Numbers Called

FIG. 12C

| 312 | 314 | 316 | 318 | 320 |
|---|---|---|---|---|
| Racenum | Status | Ball Count | Balls | Game name |

| 332 | 334 | 336 | 338 | 340 | 322 | 324 | 326 |
|---|---|---|---|---|---|---|---|
| Game Number | Game Name | Status | Jackpot | Jackpot Name | Jackpot | Jackpot name | Verification |

342 344

| Balls | Win levels |
|---|---|

FIG. 14A

| 372 | 374 | 370 | 376 | 350 | 352 | 354 | 356 | 358 | 360 |
|---|---|---|---|---|---|---|---|---|---|
| Game Number | Status | Ball Landing | Date | Time | Number of Games | Lotto Game | Verification |

| 392 | 394 | 396 | 398 |
|---|---|---|---|
| Current Game | Roulette Game Current Game | Roulette Game Previous Game | Verification |

METHOD AND APPARATUS FOR RF TRANSMITTER LAYOUT IN A GAMING HALL

FIELD

The present invention relates broadly to RF transmission of game state data in a gaming hall environment. Specifically, the present invention relates to placement of RF transmitters within a gaming hall. More specifically, the present invention relates to synchronized transmission of game state signals from multiple transmitters in a gaming hall environment.

BACKGROUND

Gaming halls have proliferated across the country and in many areas of the world, offering games such as bingo, keno, roulette, lotto, and other games where players share a common set of game state data. Computerized versions of these games have replaced traditional methods of play in many instances and provide players with remote gaming devices that allow game play at various locations inside a gaming hall. However, for games such as bingo, players that step away from the remote gaming device run the risk of missing a winning ball call and forfeiting the prize. Wireless gaming units reduce this problem to a certain degree, but reception problems are inherent to wireless environments and many gaming halls accommodate only limited transmission areas. Players using wireless systems still run the risk of forfeiting their prizes if they are momentarily in a bad reception area.

Existing gaming halls utilizing wireless environments do not adequately transmit game state data to the remote gaming devices. If a player moves into a bad reception area and back into a good reception area, the game state data that is typically broadcast is insufficient to allow a remote unit to recover any lost game state data and allow a player to continue in the game. Similarly, such game state data broadcasts are unable to allow remote units to catch up to a current game if a player enters the game anytime after its beginning.

SUMMARY

In one aspect, the present invention provides a method for operating an electronic game in a wireless system, comprising generating a game state data message describing game state; passing the game state data message to a plurality of transmitters; and transmitting from transmitters in the plurality in sequence the game state message to a wireless receiver, wherein the game state data message is transmitted repeatedly. In an embodiment, transmitters with non-overlapping transmission areas transmit the game state data message simultaneously. In an embodiment, each transmitter is located such that the wireless receiver is able to receive the game state message from at least two of the plurality of transmitters. Transmission of the game state message from each transmitter in sequence is repeated until the game state changes. In an embodiment, the method further includes generating and transmitting an updated game state message when an event occurs that changes game state. This message is repeated until the game state changes again.

The game state data message comprises game state data that can be used by multiple players in games such as bingo, keno, lotto, and roulette. In an embodiment, the game state data message may include information that describes numbers called in a numerical ordering. In an embodiment, the information describing numbers called contains a chronological ordering. In an embodiment, the game state data message includes elements such as a header; a session number; numbers called during the game; a chronological ordering of the numbers called; a game identifier; a pattern identifier; a current precall number; and a verification.

In an embodiment, the game state data message includes items such as a race number; status information; a ball count; a plurality of values, the values used in game play; a game identifier; a prize amount; a prize name; and a verification.

In an embodiment, the game state data message includes a game number; a game name; status information; a prize amount; a prize name; and information describing win levels.

In an embodiment, the game state data message includes date information; time information; number of games information; a lotto game games data structure; and a verification.

In an embodiment, the game state data message includes game number information; status information; and number selection information.

In an embodiment, the game state data message includes current game information; roulette game current game information; roulette game previous game information; and a verification.

In another aspect, the present invention provides a system for operating a game in a wireless environment wherein a plurality of transmitters transmit game state data and each transmitter is configured to transmit the same game state data in sequence with at least one other transmitter until an event in the game triggers a change in game state, at which time an updated game state signal is transmitted by each transmitter in sequence with at least one other transmitter, the system comprising a server, the server generating game state data; a base station controller, the base station controller in communication with the server; a plurality of transmitters, the transmitters in communication with the base station controller, the base station controller sending the game state data to the transmitters and synchronizing transmission by the transmitters, the transmitters located such that at least two transmitters have overlapping transmission areas.

In an embodiment, the transmitters comprise memories for storing game state data and configured to repeatedly transmit in sequence a game state signal that conveys the game state data stored in the memories.

In an embodiment, at least two transmitters are configured to transmit the game state signal simultaneously.

Many other features and advantages of the present inventions will be appreciated by those skilled in the art upon reading the following detailed description, when considered in conjunction with the accompanying drawings.

BRIEF DESCRIPTION OF THE DRAWINGS

FIGS. 9A and 9B illustrate in flowchart form acts performed in accordance with methods of the present invention that provide failure fallback from automatic to manual mode in the remote game device.

FIG. 10 illustrates in flowchart form acts performed in accordance with methods of the present invention that provide restoration of automatic mode from manual mode in the remote game device after failure fallback has been performed in accordance with a method of the present invention.

FIG. 11 illustrates in flowchart form acts performed in accordance with methods of the present invention that provide both failure fallback from automatic to manual mode as well as restoration from manual mode to automatic mode in the remote game device in accordance with a method of the present invention.

FIGS. 12A–12C illustrate various exemplary formats of data message sent to the game receiver in accordance with an embodiment of the present invention configured for the game of bingo.

FIG. 13 illustrates an exemplary format of a data message sent to the game receiver in accordance with an embodiment of the present invention configured for the game of keno.

FIGS. 14A–14B illustrate various exemplary formats of data message sent to the game receiver in accordance with an embodiment of the present invention configured for the game of lotto.

FIGS. 15A–15B illustrate various exemplary formats of data message sent to the game receiver in accordance with an embodiment of the present invention configured for the game of roulette.

DETAILED DESCRIPTION

Figure 1A:
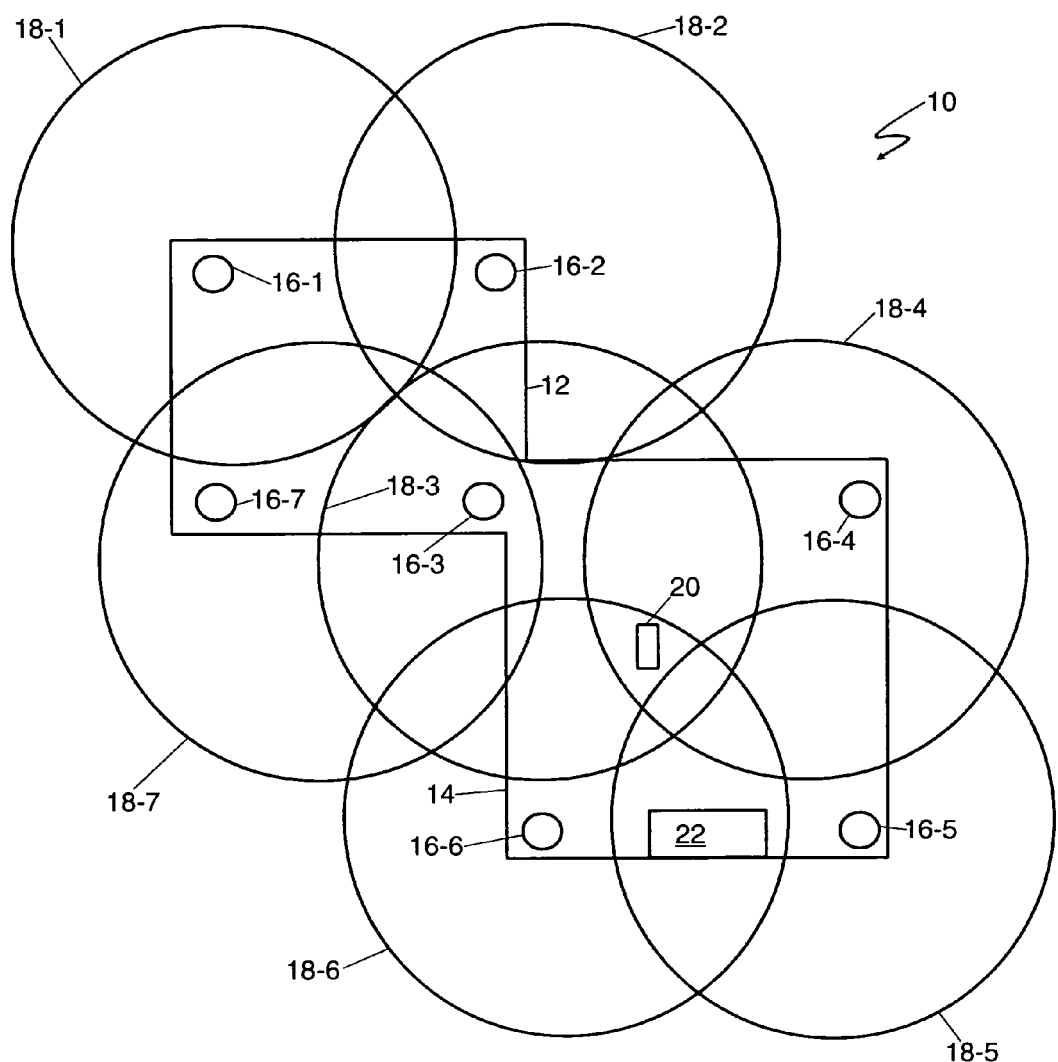
FIGS. 1A and 1B illustrate placement of RF transmitters in a bingo hall showing typical transmitter positioning and RF coverage area of each in accordance with an embodiment of the present invention.
Figure 1B:
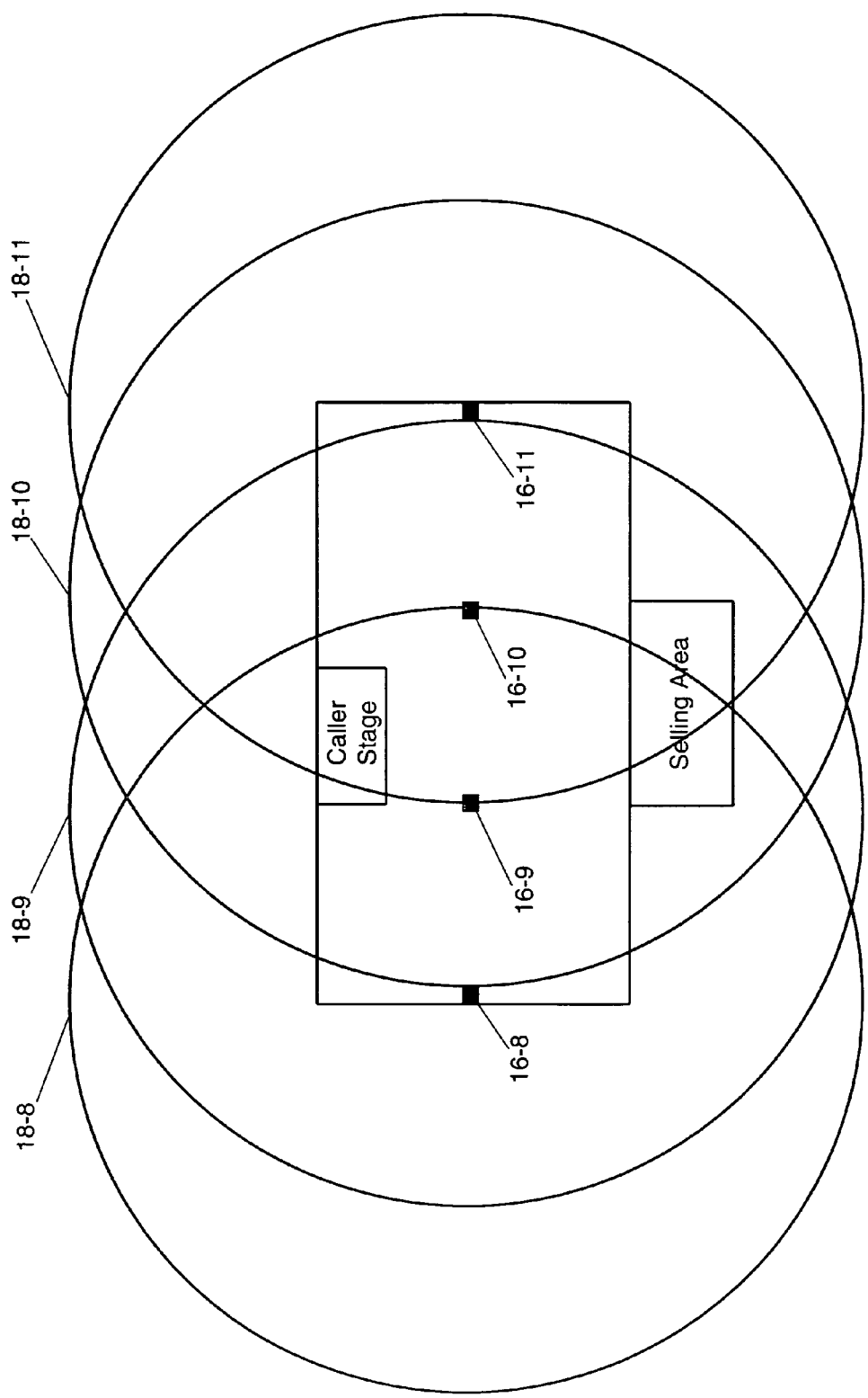

Directing attention to FIG. 1A, gaming hall 10 is configured with a plurality of game rooms 12, 14. This representation of gaming hall 10 is exemplary; many other configurations are possible, such as a single room or more than two rooms. Transmitters 16 are placed in various locations in game rooms 12, 14. Each transmitter 16 has a corresponding transmission area 18 in which RF signals transmitted from transmitter 16 may be received by receiver 20. Central RF station 22 is in communication with transmitters 16, and controls transmitters 16 to broadcast game state information to their respective transmission areas 18. Transmitters 16 are placed within gaming hall 10 such that receiver 20 may be operated in many areas within rooms 12, 14 while within more than one transmission area 18. In this configuration, receiver 20 is able to receive RF signals from anywhere within gaming hall 10. As shown in transmission area 18-7, a single transmission area can include signals from two or more transmitters 16. This feature is more clearly illustrated in FIG. 1B, where it is shown through transmitters 16-8–16-11 and corresponding transmission areas 18-8–18-11 that any location within gaming hall 10 is within transmission zones of at least two transmitters 16.

Figure 2A:
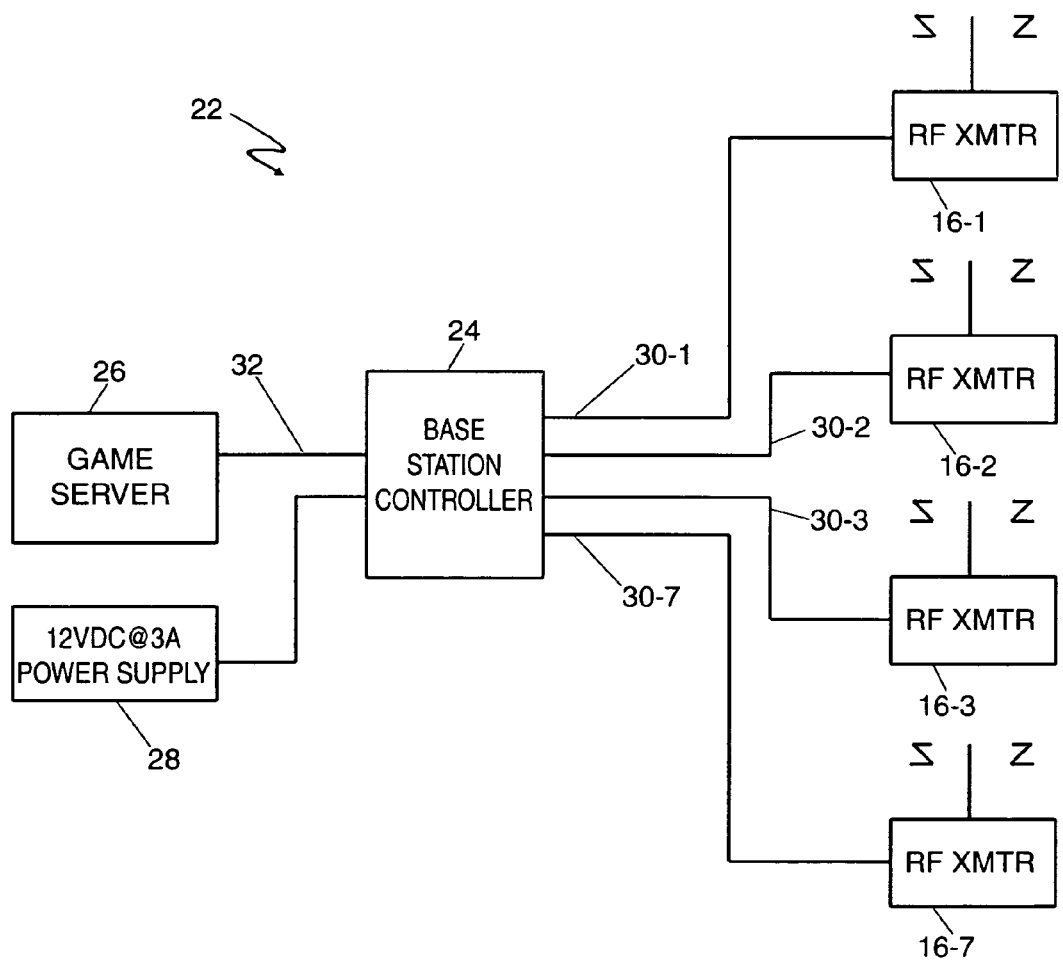
FIGS. 2A–2B illustrate in block diagram form the major components of the system of the present invention in various configurations.
Figure 2B:
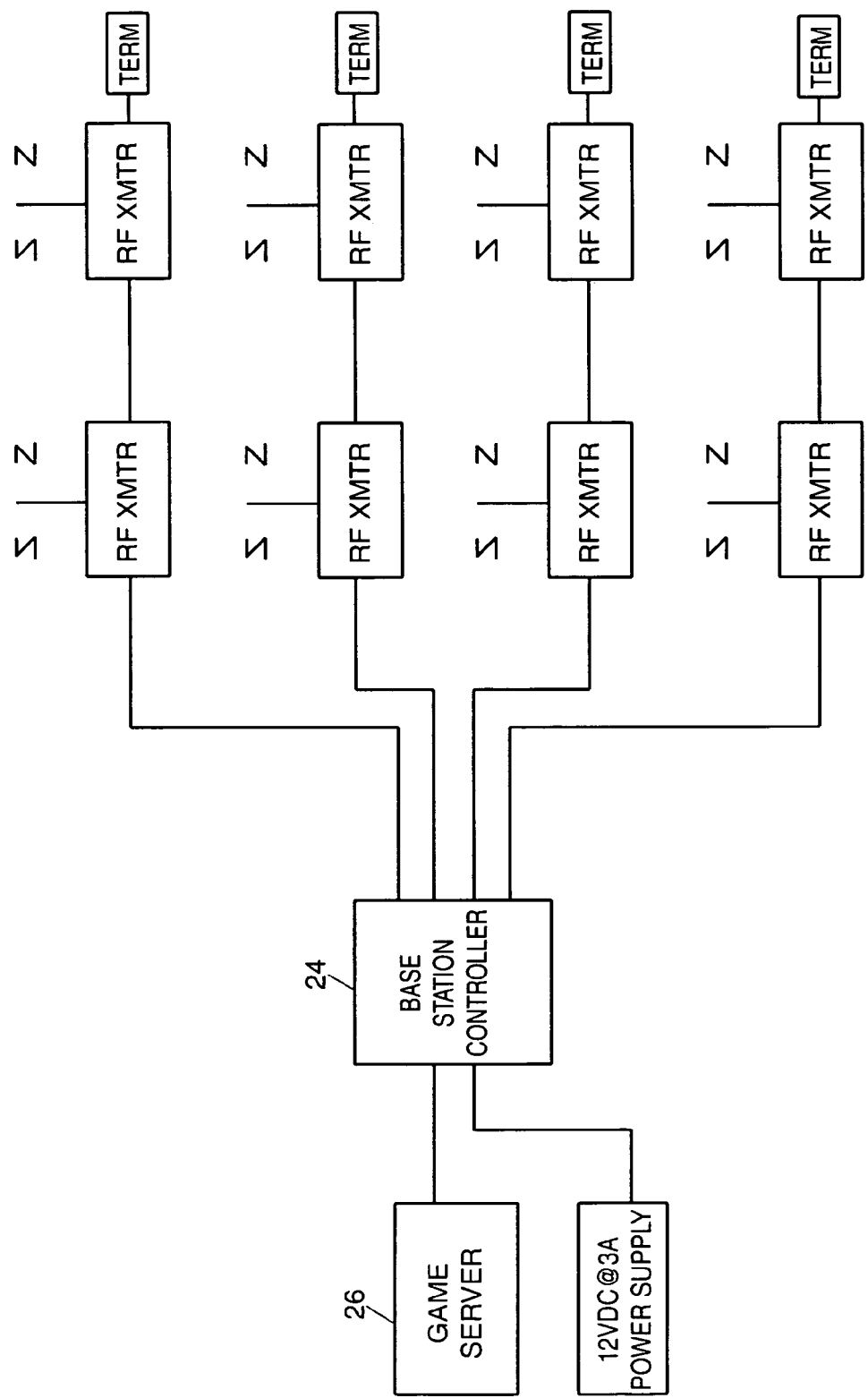

Directing attention to FIG. 2A, Central RF Station 22 includes base station controller 24, game server 26, and power supply 28. In an embodiment, a ball call device (not shown) can be included, either a manual ball blower or number generator that produces numeric values for use during game play. Base station controller 24 passes data signals to and synchronizes operation of transmitters 16 via data cables 30. In the preferred embodiment, data cable 30 comprises four CAT5 cables, up to 1000 feet in length each. While FIG. 2A depicts a common "STAR" network configuration where one transmitter is served by one cable. FIG. 2B illustrates an embodiment in which transmitters 16 are arranged in a multi-drop network where in individual cables are connected to multiple transmitters. While FIG. 2B shows two transmitters sharing a common line, it is to be understood that various numbers of transmitters can be accommodated. Base station controller 24 controllably directs transmitters 16 to transmit RF signals in a time division multiplexed sequence, such that transmitters with overlapping transmission areas 18 do not transmit simultaneously and possibly interfere with each other's RF signal, which would result in a failure for receiver 20. However, in an embodiment, transmitters that do not have overlapping transmission areas, such as transmitter 16-1 and transmitter 16-5 (FIG. 1A), can be directed by base station controller 24 to transmit simultaneously. Grouping transmitters 16 into groups that do not overlap each others' transmission areas 18 may afford more bandwidth to base station controller, thus allowing transmitters 16 to transmit more frequently than if base station controller 24 directed each transmitter to transmit in a separate time interval. The configurations shown in FIGS. 2A and 2B can also be combined for various gaming hall requirements.

Game server 26 operates an electronic game that is played on remote game device 100 that is connected to receiver 20. In the preferred embodiment, the electronic games played utilize data sets that can be utilized by a plurality of players, such as bingo, keno, lotto, roulette, and the like. Such electronic games are known to those skilled in the art and are not discussed herein. Game server 26 transmits game state information across connection line 32 to base station controller 24, which in turn sends the game state information across data cable 30 to transmitter 16. In the preferred embodiment, connection line 32 comprises a 9-pin RS-232 cable that is up to 25 feet in length. Base station controller 24 sends game state information to RF signal transmitter 16. In the preferred embodiment, transmitter 16 transmits the game state signal in repetition until a new game state is sent from game server 26 to base station controller 24.

Power supply 28 in the preferred embodiment supplies 12 VDC at 3 Amps to base station controller 24. Base station controller 24 and transmitters 16 in the preferred embodiment are low power units that use power supply 28. Data cable 30 connects the 12 VDC power to transmitters 16.

Figure 3:
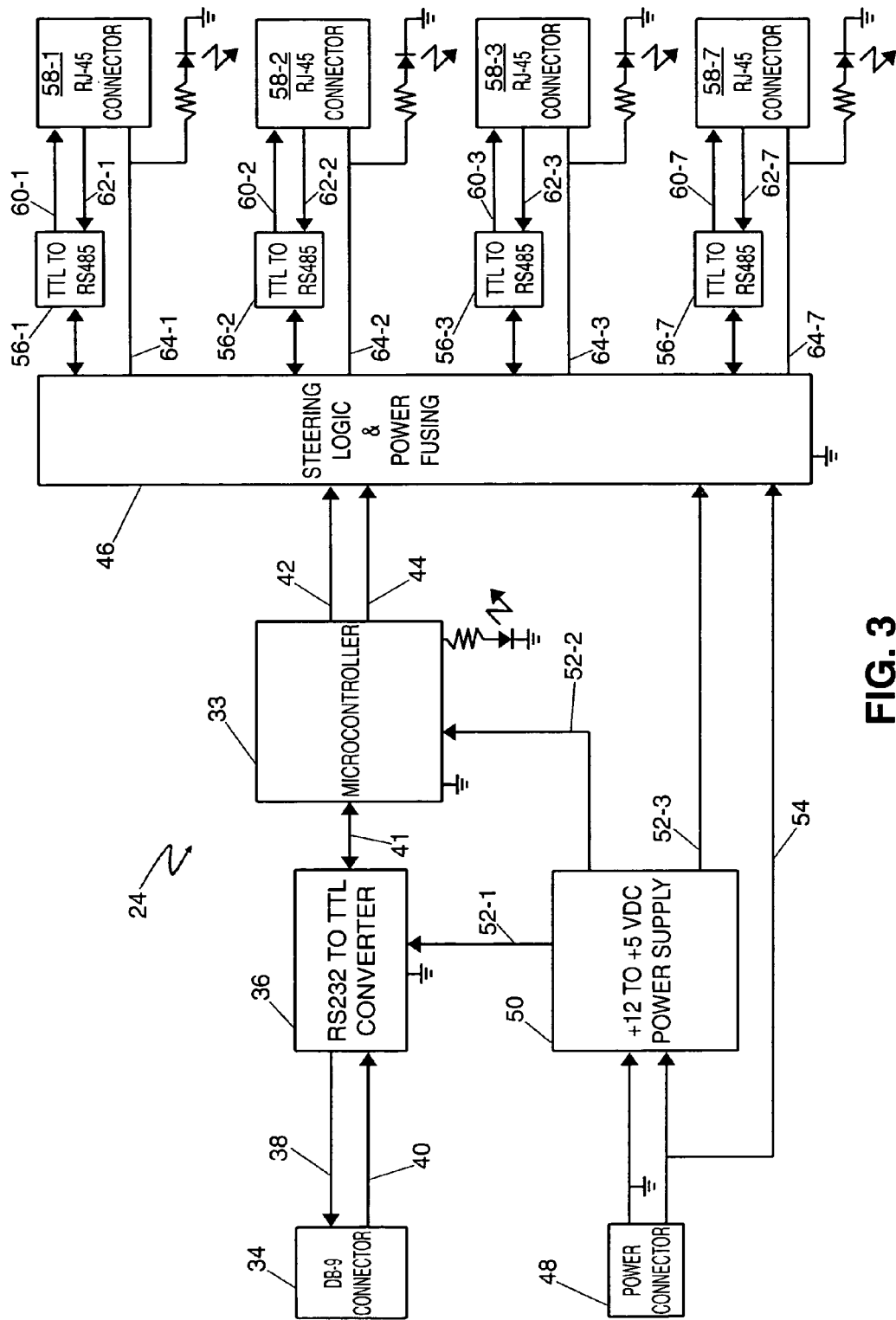
FIG. 3 illustrates in block diagram form the major components of the base station controller according to an embodiment of the present invention.

Directing attention to FIG. 3, base station 24 is illustrated in a detailed block diagram. Microcontroller 33 routes data received from game server 26. Game server 26 connects to DB-9 connector 34, which transfers the received game state information to RS232 to TTL converter 36 over RX line 40. TX line 38 is used by RS232 to TTL converter 36 to relay control signals back to DB-9 connector 34. RS232 to TTL converter 36 passes the received game state data to microcontroller 33 over data connection line 41. Microcontroller 33 then transmits game state data in the form of a TTL signal over data line 42 to steering logic and power fusing module 46, and transmitter address information over line 44. In this manner, microcontroller 33 controllably operates transmitters 16 as described above, either individually or in groups, depending on bandwidth requirements and the configuration of gaming hall 10.

12 VDC power from power supply 28 is passed through power connector 48 to steering logic and power fusing module 46 via +12 VDC power line 54. It is also passed to +12 VDC to +5 VDC power supply 50, which distributes +5 VDC to RS232 to TTL converter 36, microcontroller 33, and steering logic and power fusing module 46 on +5 VDC lines 52.

Steering logic and power fusing module 46 receives TTL data and transmitter address data from microcontroller 33. TTL data is passed from the steering logic and power fusing module 46 to TTL to RS485 converter 56. The game state data, now in RS-485 form, is passed to RJ-45 connector 58 over data out line 60. Data in line 62 passes confirmation data from transmitter 16 through the RJ-45 connector connected to transmitter 16. Steering logic and power fusing module 46 also powers transmitter 16 via +12V fused power line 64. As shown in FIG. 3, separate TTL to RS485 converters 56, RJ-45 connectors 58, data out lines 60, data in lines 62, and fused +12V power lines 64 are implemented for each transmitter 16. While the above description is directed to the preferred embodiment, those skilled in the art will readily understand that many modifications can be made to achieve various embodiments.

Figure 4:
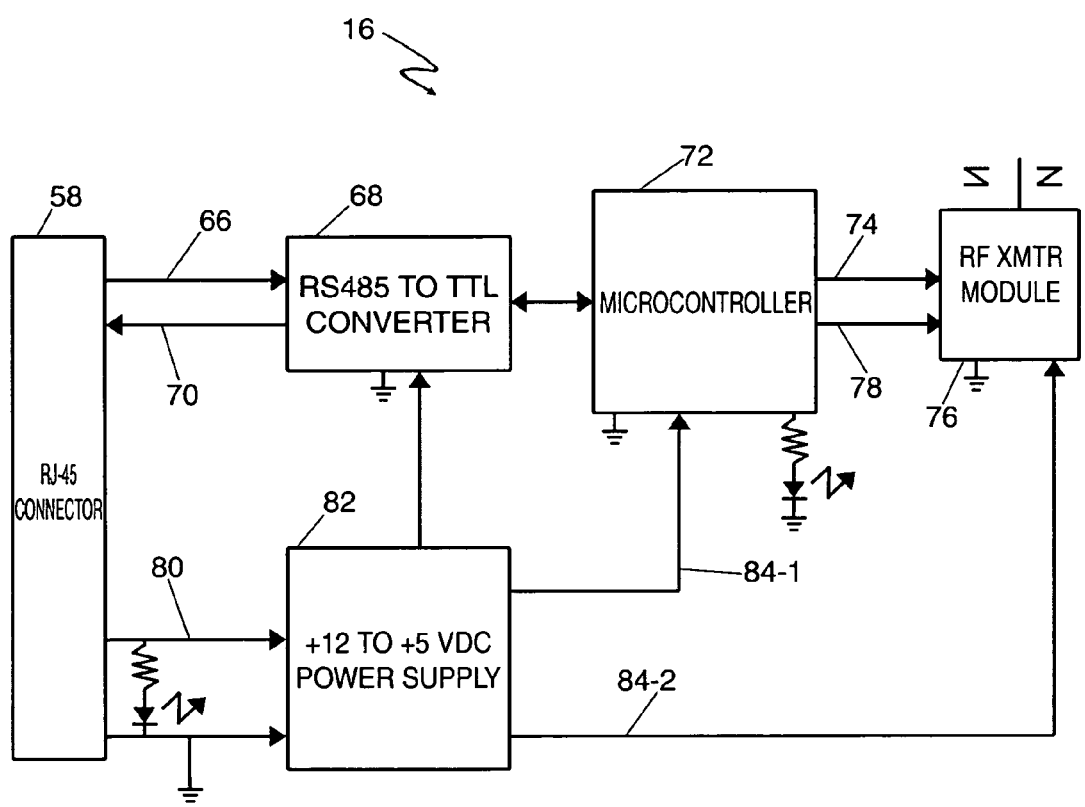
FIG. 4 illustrates in block diagram form the major components of the game state transmitter according to an embodiment of the present invention.

Directing attention to FIG. 4, transmitter 16 is illustrated in detailed block diagram form. Game state signals are passed from RJ-45 connector 58 on transmit line 66 to RS485 to TTL converter 68. Receive line 70 passes confirmation data back to base station controller 24 through RJ-45 connector 58. Game state data is then passed to microcontroller 72. Microcontroller 72 includes memory for storing game state data that is transmitted to receiver 20, and instructions which, when executed by microcontroller 72, perform operations to verify the validity of game state data received from base station controller 24. Microcontroller 72 sends game state data to transmitter module on data line 74 to RF transmitter module 76, and transmit enable signals on transmit enable line 78. 12V fused power is passed from RJ-45 connector 58 on +12 VDC line 80 to +12 to +5 VDC power supply 82. +12 to +5 VDC power supply 82 powers microcontroller 72 and RF transmitter module 76 via +5 VDC power lines 84.

Figure 5:
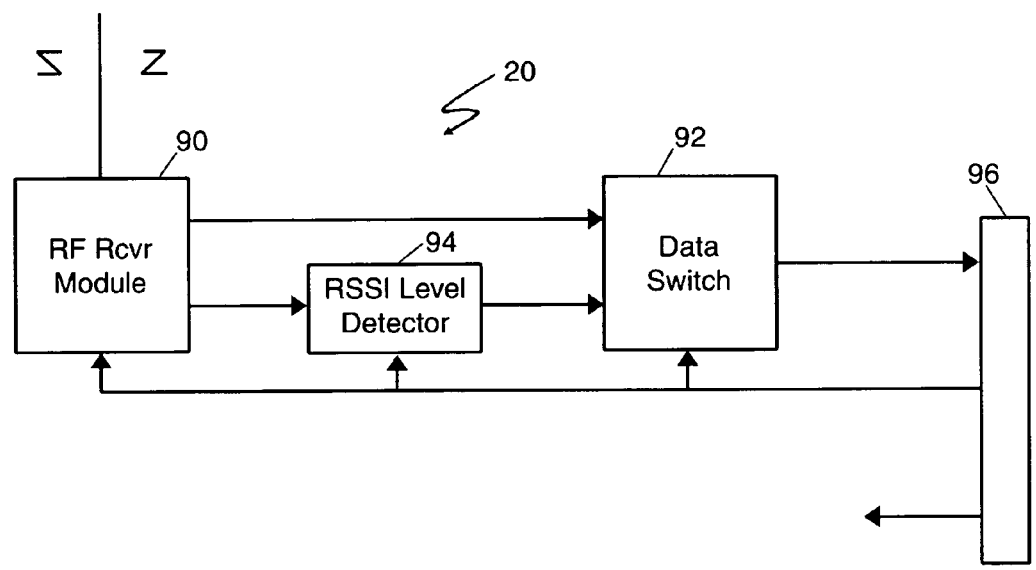
FIG. 5 illustrates in block diagram form the major components of the wireless game state receiver according to an embodiment of the present invention.

Directing attention to FIG. 5, receiver 20 is illustrated in detailed block diagram form. Game state signals transmitted by transmitter 16 are received by RF receiver module 90. RF receiver module 90 sends the game state signal as raw data to data switch 92, and also sends signal strength data to receive signal strength indicator (RSSI) level detector module 94. If the received game state signal is of sufficient strength, receive signal strength indicator level detector module 94 sends a data enable signal to data switch 92. If data switch 92 receives the data enable signal, the raw data is considered valid, and valid game state data is passed to remote game device 100 over connector 96. Connector 96 also relays power from remote game device 100 to RF receiver module 90, data switch 92, and receive signal strength indicator level detector module 94. While the above description is directed to the preferred embodiment, those skilled in the art will readily understand that many modifications can be made to achieve various embodiments.

Figure 6:
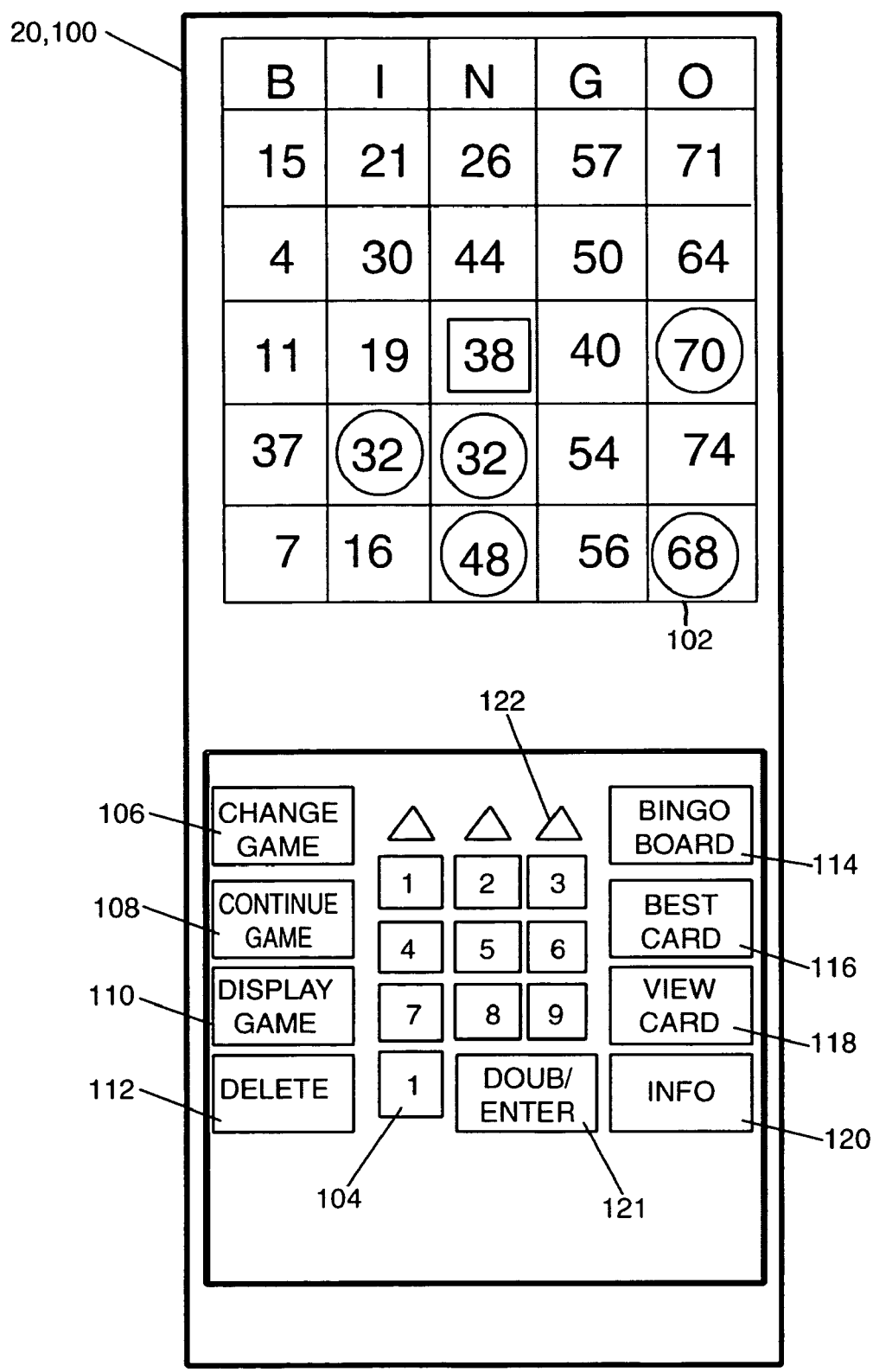
FIG. 6 illustrates in block diagram form the major components of the remote game device according to an embodiment of the present invention.

Directing attention to FIG. 6, receiver 20 and remote game device 100 are shown as an integrated unit. Display 102 shows an electronic implementation of a conventional bingo game to the user, and numbers, symbols, or other indicia that are generated during the game that have a match with the electronic bingo card are highlighted. While a bingo game is shown on display 102 in FIG. 6, various other display configurations can be implemented to utilize the invention for games such as keno, lotto, roulette, etc. Below display 102 is keypad 104, which allows a user to enter numerical values to interact with Central RF Station 22 and play various games. Function keys may also be provided, such as change game key 106, continue game key 108, display game key 110, delete key 112, bingo board key 114, best card key 116, view card key 118, information key 120, and daub/enter key 121. Arrow keys 122 are soft keys that can change during operation to be used for various functions according to game state. Various programs are resident in the memory of remote game device that are designed to handle game state data received from transmitters 16. A microcontroller in remote game device 100 executes these programs to allow users to play the games administered by game server 26.

Figure 7:
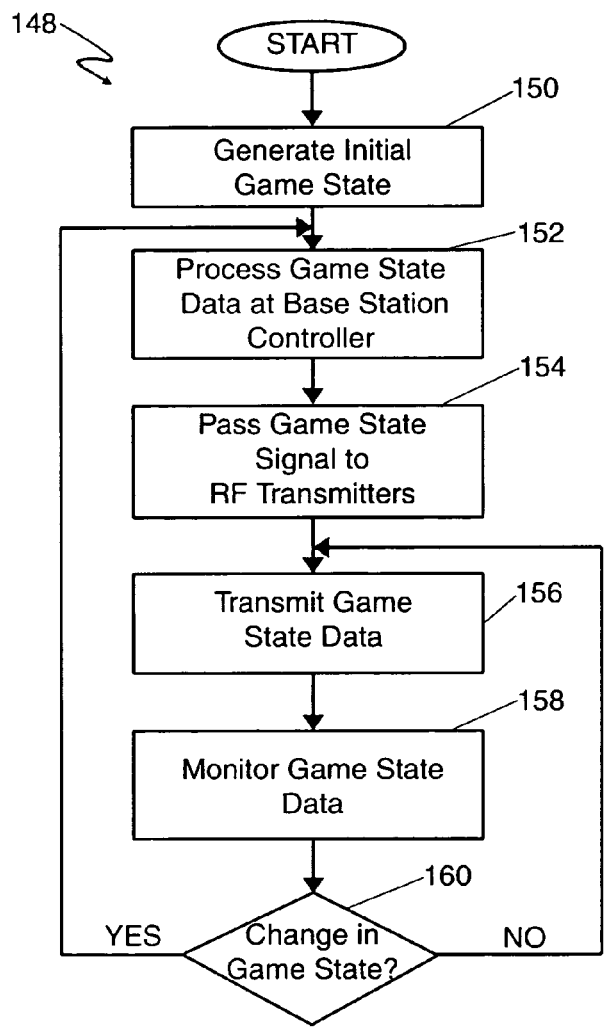
FIG. 7 illustrates in flow chart form the acts performed by a method according to an embodiment of the present invention.

FIG. 7 illustrates in flowchart form a sequence of acts 148 performed in accordance with a method of the present invention. As described above, game server 26 generates initial game state data at act 150. At act 152, the game state data is passed to base station controller 24. At act 154 the game state data are passed to transmitters 16. The game state data is then transmitted (act 156) by the transmitters 16 inside gaming hall 10. As described above, the transmitters are operated in sequence such that transmitters with overlapping or potentially overlapping transmission areas are transmitted at different time intervals to prevent a transmitter from canceling the RF signal transmitted by a neighboring transmitter. At act 158, the game state is monitored by base station controller 24. If no new game state has been communicated by game server 26 to base station controller 24 (act 160), the game state RF signal transmitted at act 156 is transmitted again. Control loops until new game state data is issued by game server 26, at which time control loops back to act 152, where the new game state data is processed by the base station controller 24.

Four different types of commands are generated by game server 26 and sent to base station controller 24 and transmitter 16: Load, Transmit Once, Continuous Transmission and Stop Transmission. The Load command is used to load a game state data message into each transmitter 16. In an embodiment, the game state data message is broadcast repeatedly until the game state changes.

The Transmit Once command in an embodiment of the present invention is a single ASCII byte representing the letter "T." This command tells base station controller 24 to command transmitters 16 to transmit the data in their memories once. Base station controller 24 responds with an ACK.

The Continuous Transmission command in an embodiment of the present invention is a single ASCII byte representing the letter "C." This command is similar to the "T" command except base station controller 24 goes into a loop mode and sequentially commands transmitters 16 to transmit the data in their buffers repeating indefinitely. Base station controller 24 responds with an ACK.

The Stop Transmission command in an embodiment of the present invention is a single ASCII byte representing the letter "S." This command tells base station controller 24 to cease the Continuous Transmission mode. Base station controller 24 responds with an ACK.

Figure 8:
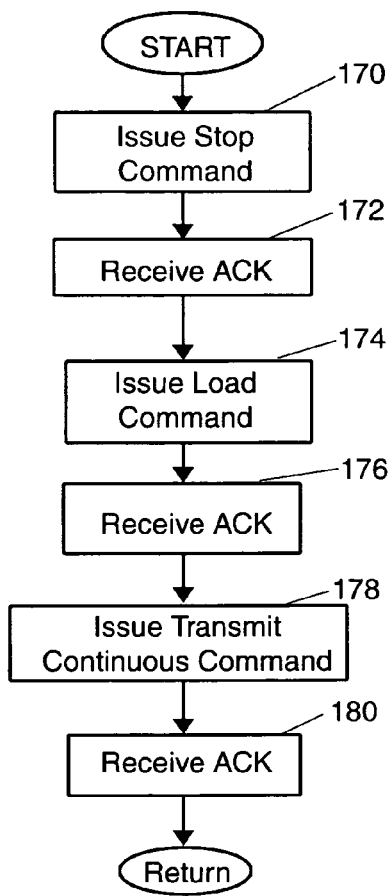
FIG. 8 illustrates in flow chart form acts performed in accordance with a method of the present invention.

FIG. 8 illustrates a typical sequence of acts performed by game server 24 in accordance with an embodiment of the present invention. At act 170, game server 26 issues a Stop Transmission command to base station controller 24. At act 172, game server 26 receives an ACK from base station controller 24 in response to the issued Stop Transmission command. At act 174, game server 26 issues a Load command with game state information to base station controller 24. At act 176, game server 26 receives an ACK from base station controller 24 in response to the issued Load command. At act 178 game server 26 issues a Transmit Continuous command to base station controller 24. At act 180, game server 26 receives an ACK from base station controller 24 in response to the issued Transmit Continuous command.

Directing attention to FIG. 9A, receiver 20 and remote game device 100 work together to provide failure fallback in the event that signal strength falls below a certain level or is not received from transmitter 16. In the case where a player carries the remote game device out of transmission areas 18, such as during a trip to a restroom, telephone area, parking lot, etc., RSSI level detector 94 functions as described above and receiver 20. Sequence of acts 198 is performed by remote game device 100. Beginning at act 200, RF receiver module 90 (FIG. 5) listens for the game state signal transmitted by transmitter 16. In act 202, as described above, RSSI level detector 94 attempts to measure a received game state signal. If the signal strength is sufficient (act 204), control returns to act 200. If the signal is not sufficiently strong, or if no signal was received, control proceeds to act 206, where remote game device 100 transitions to manual mode. In the preferred embodiment, a notification is presented to the user, in an audible signal and/or text message displayed game display 102. While remote game device 100 is in manual mode, the user is responsible for operating keys 104–122 on remote game device 100 to update the game state and continue play.

In many instances, an interruption in game state signal is very slight and lasts only a brief duration. FIG. 9B illustrates a sequence of acts 210. Beginning at act 212, RF receiver module 90 listens for the game state signal transmitted by transmitter 16. In act 214, as described above, RSSI level detector 94 attempts to verify the game state message. If the signal strength is sufficient (act 216), control returns to act 212. If the signal is not sufficiently strong, or no signal was received, control proceeds to act 218, wherein a local clock (not shown) in remote game receiver 100 is checked to see if a timeout has occurred. A timeout occurs when a valid game state signal is not received over a predetermined period of time. By resetting the local clock when a valid game state signal is received, a timeout can be easily detected. If no timeout has occurred, control returns to act 212. However, if a timeout has occurred, control proceeds to act 220, where remote game device 100 transitions to manual mode as described above.

In preferred embodiments, sequences of acts 198, 210 are stored as computer readable instructions inside the memory of remote game device 100 and are executed as background processes by a microprocessor that manages the operations of remote game device 100. Another sequence of acts 222, illustrated in FIG. 10, also is stored and executed on remote game device 100. Sequence of acts 222 serves to restore remote game device 100 from manual mode to automatic mode. Beginning at act 224, RF receiver module 90 (FIG. 5) listens for the game state signal transmitted by transmitter 16. In act 226, as described above, RSSI level detector 94 attempts to verify the game state message. If the signal strength is insufficient, or no signal was received (act 228), control returns to act 222 and remote game device 100 remains in manual mode. If the signal is sufficiently strong, control proceeds to act 206, where remote game device 100 is checked to see if it is in manual mode. If it is not, control returns to act 222. If remote game device 100 is in manual mode, control proceeds to act 232, where remote game device 100 transitions to automatic mode. In the preferred embodiment, a notification is presented to the user, in an audible signal and/or text message displayed game display 102.

FIG. 11 illustrates an alternative embodiment that combines the functionality of act sequences 198, 210 and 222. Sequence of acts 240 begins at act 242, where RF receiver module 90 listens for the game state signal transmitted by transmitter 16. In act 244, as described above, RSSI level detector 94 attempts to verify the game state message. If the signal strength is sufficient (act 246), control proceeds to act 248. If remote game device 100 is in manual mode, control proceeds to act 250, where remote game device 100 switches to automatic mode. Control then returns to act 242. Returning to act 248, if remote game device 100 is not in manual mode, control bypasses act 250 and returns directly to act 242. Returning to act 246, if the received signal is not valid, control proceeds to act 252. At act 252, if a timeout is detected, control returns to act 242. Otherwise, control proceeds to act 254, and remote game device 100 transitions to manual mode. In the preferred embodiment, a notification is presented to the user, in an audible signal and/or text message displayed game display 102.

Transmission of game state data messages from base station controller 24 to transmitter 16 in the preferred embodiment is performed in accordance with a Power Over Ethernet (POE) application. DC power is transferred from base station controller 24 to transmitter 16 using four of the eight wires available in CAT5 cable 30. Data is transmitted between base station controller 24 and transmitter 16 using the remaining four wires configured as two twisted pairs in an RS-485 half duplex configuration. One pair is used for the transmission of data and the other is used for reception. Data is transmitted as an asynchronous data stream using an 8-N-1 format (8 bytes, no parity, 1 stop bit).

Transmitter 16, upon receipt of the Load command from base station controller 24, performs an internal verification of the accuracy of the data through a CRC or checksum. Transmitter 16 responds with a single ASCII byte: an acknowledgement (ACK) (06h) if the data is CRC or checksum verified or a negative acknowledgement (NAK) (15h) if the CRC verification fails. Upon receipt of a NAK, base station controller 24 retransmits the data to transmitter 16.

Upon reception of a Transmit command from base station controller 24, transmitter 16 turns on its internal RF carrier. If data has not been previously loaded the "T" command is ignored. The data packet stored in local memory on microcontroller 72 is augmented before it is actually transmitted. This augmentation consists of an exclusive or (XOR) operation being performed on each byte of data to invert the entire byte. Each true data byte and the constructed inverted data byte is then transmitted sequentially as part of the continuous data stream. This operation is performed to ensure the data presented to transmitter 16 is DC balanced to ensure center frequency stability of the RF carrier. The augmented data packet followed by a CRC together comprise the data packet that is transmitted over the RF carrier.

When receiver 20 receives a data packet from transmitter 16, it performs two operations to ensure accurate data. First, each byte and the inverted byte are compared in software through an exclusive OR process. Through this algorithm each of the bytes of the original data packet is reconstructed and verified as being true representations of the transmitted data bytes. The process is performed sequentially on every byte in the packet. Once the data is verified by this method, the received CRC is verified against the locally calculated CRC. If either of these tests fail the entire packet is thrown away and receiver 20 retrieves a new packet on the next transmission.

FIGS. 12–15 illustrate various formats of game state data messages sent with a Load command. Different games require different game state data, and various game state data combinations may be used for a single game, depending on processing capabilities desired of remote game device 100. Game server 26 generates the contents of the game state. The game state data message is passed to base station controller 24 in a Load command. Base station controller in turn sends the Load command with the game state message to transmitters 16. As referred to herein, "ball" refers to a value used during game play.

FIG. 12A illustrates a very simple game state data message used in bingo games. Message 270 includes numbers called 272. Numbers called 272 can be implemented as a bit mask that reflect numbers called in a bingo game. As shown in FIG. 11B, message 274 can include numbers called 276 as well as numbering order 278, which gives the sequence for values in numbers called 276. FIG. 12B illustrates a more elaborate message 280. Header 282 is a simple header that informs transmitter 16 that data will follow. Header 282 in the preferred embodiment is a two-byte word. Session number 284 is a byte containing a value that indicates the current game session. In the preferred embodiment, different values are used to represent morning, afternoon, and evening bingo sessions. Numbers called 286 and numbering order 288 as described above are included. Game identifier 290 is a byte that identifies the current game being played. Pattern 292 is a byte containing a value indicating the current pattern being played. Last number called 294 is a byte containing a value indicating the last number to be released by game server 26.

While last number called 294 is illustrated in FIG. 12C, it is to be understood that is useful only when numbering order 288 is not included in message 280. Thus, if numbers called 286 is a purely numerical ordering with no chronological order, last number called 294 provides a degree of chronological order. Current precall number 304 is a byte containing a value indicating a number to be released that has not yet been called by game server 26. Verification 306 is a byte or plurality of bytes that contain data that allows a cyclic redundancy check to be performed by receiver 20 to verify the accuracy of data message 280 sent with the load command. Alternatively, verification 306 can be implemented as a checksum byte. Additional information (not shown) may also be included in message 280, such as the beginning of a game, the end of a game, or an updated prize amount in an embodiment where a progressive jackpot is paid to the winner of a bingo game.

FIG. 13 illustrates data message 310 that can be used for the game of keno. Racenum 312 is a plurality of bytes that identifies the game number being played. Status 314 is a plurality of bytes that indicates the status of a game, such as in progress, completed, etc. Ballcount 316 is a byte that indicates the number of values being played in a game. Balls 318 is a byte array that describes the balls that have been called for this game. Gamename 320 is a byte that identifies the game being played. Jackpot 322 is a plurality of bytes that indicates the amount of a prize to be awarded the winner of the game. Jackpot name 324 is a byte that identifies the jackpot to be paid the winner. Verification 326 as explained above may also be included as either CRC bytes or a checksum byte.

FIG. 14A illustrates data message 330 that can be used for a game of lotto. Gamenum 332 and game name 334 are bytes that provide identification of the game being played. Status 336 is a plurality of bytes that indicates the game status as explained above. Jackpot 338 is a plurality of bytes that indicates the amount of a prize to be awarded the winner of the game. Jackpot name 340 is a byte that identifies the jackpot to be paid the winner. Balls 342 is a byte array that describes the balls that have been called for this game. Winlevels 344 is a byte array that describes how many balls correct are required to win a particular prize.

FIG. 14B illustrates data message 350 that can be used to convey state information for a series of lotto games. Date 352 and time 354 are pluralities of bits that indicate when the games were played. Numgames 356 is a plurality of bytes that define how many games are contained within this game state. LottoGame games 358 is a data structure that describes a single game of lotto. Verification 360 as explained above may also be included as either CRC bytes or a checksum byte.

FIG. 15A illustrates data message 370 that can be used for the game of roulette. Gamenum 372 is a plurality of bytes that provides identification of the game being played. Status 374 is a byte that indicates the game status as explained above. Ball landing number 376 indicates the number selected as a winning number.

FIG. 15B illustrates data message 390 that can be used to convey state information for a roulette game. Current game 392 is a byte that identifies the current game being played. Current game 394 is a data structure that contains the description of a single game of roulette. This game is the most recent game played. Previous games 396 is a data structure that contains the description of some number of previous games played. This allows the player to see the results of previous games, even if they left the RF signal area temporarily. Verification 398 as explained above may also be included as either CRC bytes or a checksum byte.

Figure 16:
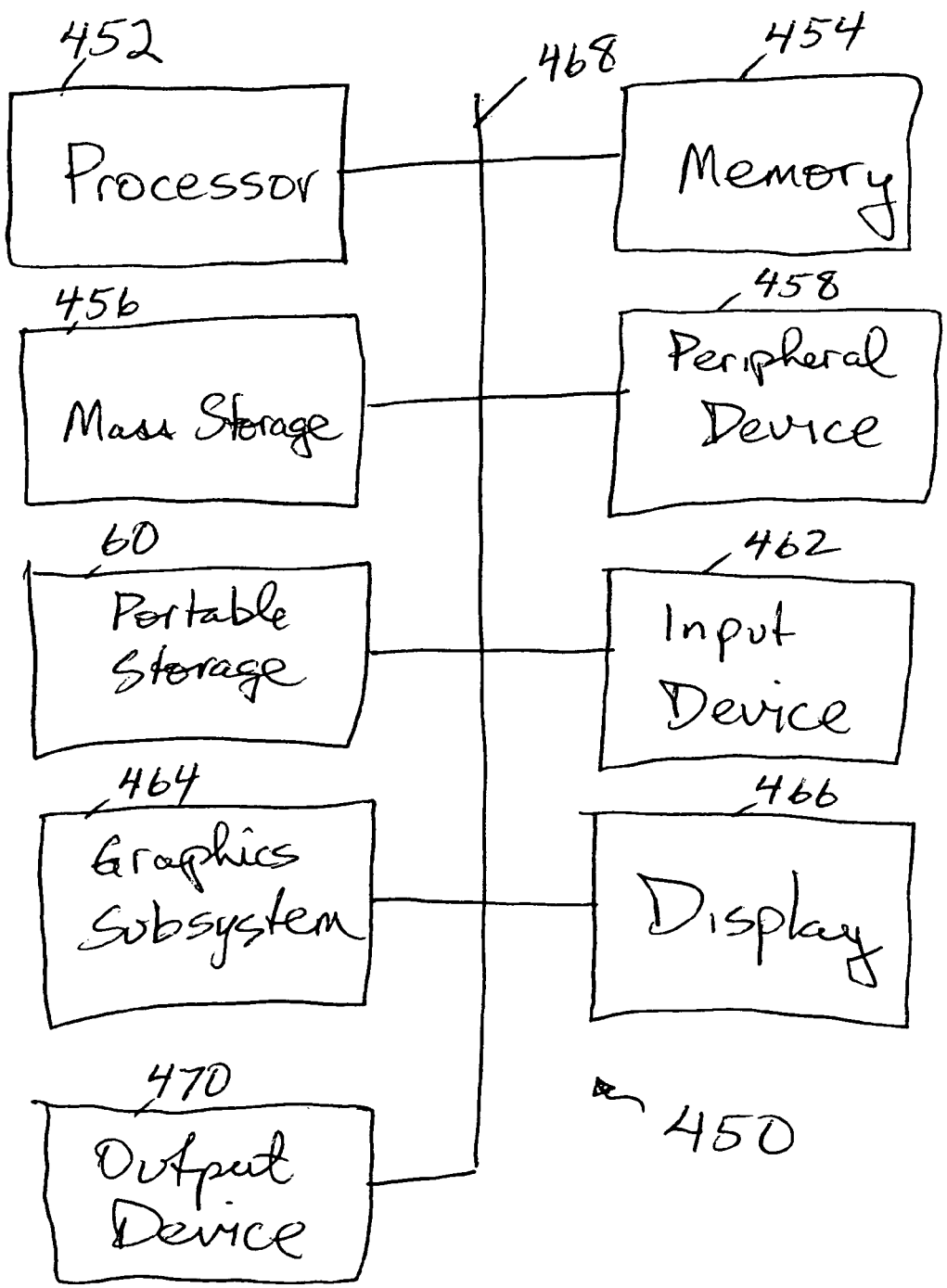
FIG. 16 illustrates in block diagram form the major components of the game server according to an embodiment of the present invention.

FIG. 16 is a high-level block diagram view of an embodiment of a computer system 450 suitable for implementing game server 26. Computer system 450 includes a processor 452 and memory 454. Processor 452 may contain a single microprocessor, or a plurality of microprocessors if embodiments where computer system 450 is configured as a multi-processor system. Memory 454, stores, in part, instructions and data for execution by processor 452. For example, game server 26 includes in memory 454 the application software for operating an electronic version of a bingo game that is played on remote game device 100. If the system of the present invention is wholly or partially implemented in software, including a computer program, memory 454 stores the executable code when in operation. Memory 454 may include banks of dynamic random access memory (DRAM) as well as high-speed cache memory. Computer system 450 may further include mass storage device 456, peripheral device(s) 458, portable storage medium drive(s) 460, input device(s) 462, a graphics subsystem 464 and a display 466.

For simplicity, the components shown in FIG. 15 are depicted as being connected via a single bus 468. However, the components may be connected through one or more data transport means. For example, processor 452 and memory 454 may be connected via a local microprocessor bus, and the mass storage device 456, peripheral device(s) 458, portable storage medium drive(s) 460, and graphics subsystem 464 may be connected via one or more input/output (I/O) buses. Mass storage device 456, which is typically implemented with a magnetic disk drive or an optical disk drive, is a non-volatile storage device for storing data and instructions for use by processor 452.

Methods for operating electronic games may also be stored in processor 452. Portable storage medium drive 460 operates in conjunction with a portable non-volatile storage medium, such as a floppy disk, or other computer readable medium, to input and output data and code to and from computer system 450. Peripheral device(s) 458 may include any type of computer support device, such as an input/output (I/O) interface, to add additional functionality to the computer system 450. For example, peripheral device(s) 458 may include a network interface card for interfacing computer system 450 to a network, a modem, and the like. Input device(s) 462 provide a portion of a user interface. Input device(s) 462 may include an alphanumeric keypad for inputting alphanumeric and other key information, or a pointing device, such as a mouse, a trackball, touch screen, stylus or cursor direction keys.

In order to display textual and graphical information, computer system 450 includes graphics subsystem 464 and display 466. Display 466 may include a cathode ray tube (CRT) display, liquid crystal display (LCD), other suitable display devices, or means for displaying, that enables a user to interact with the computer program to configure the application objects and implement the workflows. Graphics subsystem 464 receives textual and graphical information and processes the information for output to display 466. Display 466 can be used to display an interface to interact with a user to configure the application objects and implement workflows and/or display other information that is part of a user interface. Additionally, computer system 450 includes output devices 470. Examples of suitable output devices include speakers, printers, and the like.

The components illustrated in the computer system 450 are those typically found in general purpose computer systems, and are intended to represent a broad category of such computer components that are well known in the art. Computer system 450 illustrates one platform that may be used for practically implementing embodiments of the present invention. Numerous other platforms can also suffice, such as Macintosh-based platforms available from Apple Computer, Inc., platforms with different bus configurations, networked platforms, multiprocessor platforms, other personal computers, workstations, mainframes, navigation systems, and the like. Alternative embodiments using the method of the present invention in conjunction with the computer system 450 further include using other display means for the monitor, such as CRT display, LCD display, projection displays, or the like. Likewise, any similar type of memory, other than memory 454, may be used. Other interface apparatus, in addition to the component interfaces, may also be used including alphanumeric keypads, other key information or any pointing devices such as a mouse, trackball, touch screen, stylus, cursor or direction key.

While the preferred embodiment of the present invention has been illustrated and described in detail, it is to be understood that the figures and detailed description are merely illustrative and many modifications can be made without departing from the spirit of the invention.

What is claimed is:

1. A method for operating an electronic game in a wireless system, comprising:
    generating a game state data message describing game state;
    passing the game state data message to a plurality of transmitters; and
    transmitting in sequence from transmitters in the plurality the game state message to a wireless receiver, wherein the game state data message is transmitted repeatedly.

2. The method of claim 1, wherein transmitters with non-overlapping transmission areas transmit the game state data message simultaneously.

3. The method of claim 1, wherein each transmitter is located such that the wireless receiver is able to receive the game state message from at least two of the plurality of transmitters.

4. The method of claim 1, wherein transmitting the game state message from each transmitter in sequence is repeated until the game state changes.

5. The method of claim 1, further including generating an updated game state message when an event occurs that changes game state.

6. The method of claim 5, further comprising passing the updated game state message to the plurality of transmitters.

7. The method of claim 6, further comprising transmitting from each transmitter in sequence the updated game state data message to a wireless receiver.

8. The method of claim 7, wherein transmitting the updated game state data message from each transmitter in sequence is repeated until the game state changes.

9. The method of claim 1, wherein the game state data message comprises information describing a game state in a game played on a remote game device.

10. The method of claim 9, wherein the game state data message includes a plurality of values, the values used in game play.

11. The method of claim 10, wherein the game state data message includes a race number.

12. The method of claim 10, wherein the game state data message includes status information.

13. The method of claim 10, wherein the game state data message includes a ball count.

14. The method of claim 10, wherein the game state data message includes a prize amount.

15. The method of claim 10, wherein the game state data message includes a prize name.

16. The method of claim 9, wherein the information describes numbers called in a numerical ordering.

17. The method of claim 9, wherein the game state data message includes a chronological ordering of the numbers called.

18. The method of claim 17, wherein the game state data message includes a game number.

19. The method of claim 17, wherein the game state data message includes a game name.

20. The method of claim 17, wherein the game state data message includes information describing win levels.

21. The method of claim 9, wherein the game state data message includes a header.

22. The method of claim 9, wherein the game state data message includes a session number.

23. The method of claim 9, wherein the game state data message includes a number of balls called during the game.

24. The method of claim 9, wherein the game state data message includes a game identifier.

25. The method of claim 9, wherein the game state data message includes a pattern identifier.

26. The method of claim 9, wherein the game state data message includes a current precall number.

27. The method of claim 9, wherein the game state data message includes a verification.

28. The method of claim 9, wherein the game state data message further includes date information.

29. The method of claim 9, wherein the game state data message includes time information.

30. The method of claim 9, wherein the game state data message includes number of games information.

31. The method of claim 9, wherein the game state data message includes a lotto game games data structure.

32. The method of claim 9, wherein the game state data message includes: number selection information.

* * * * *